Figures 1, 2, 3:
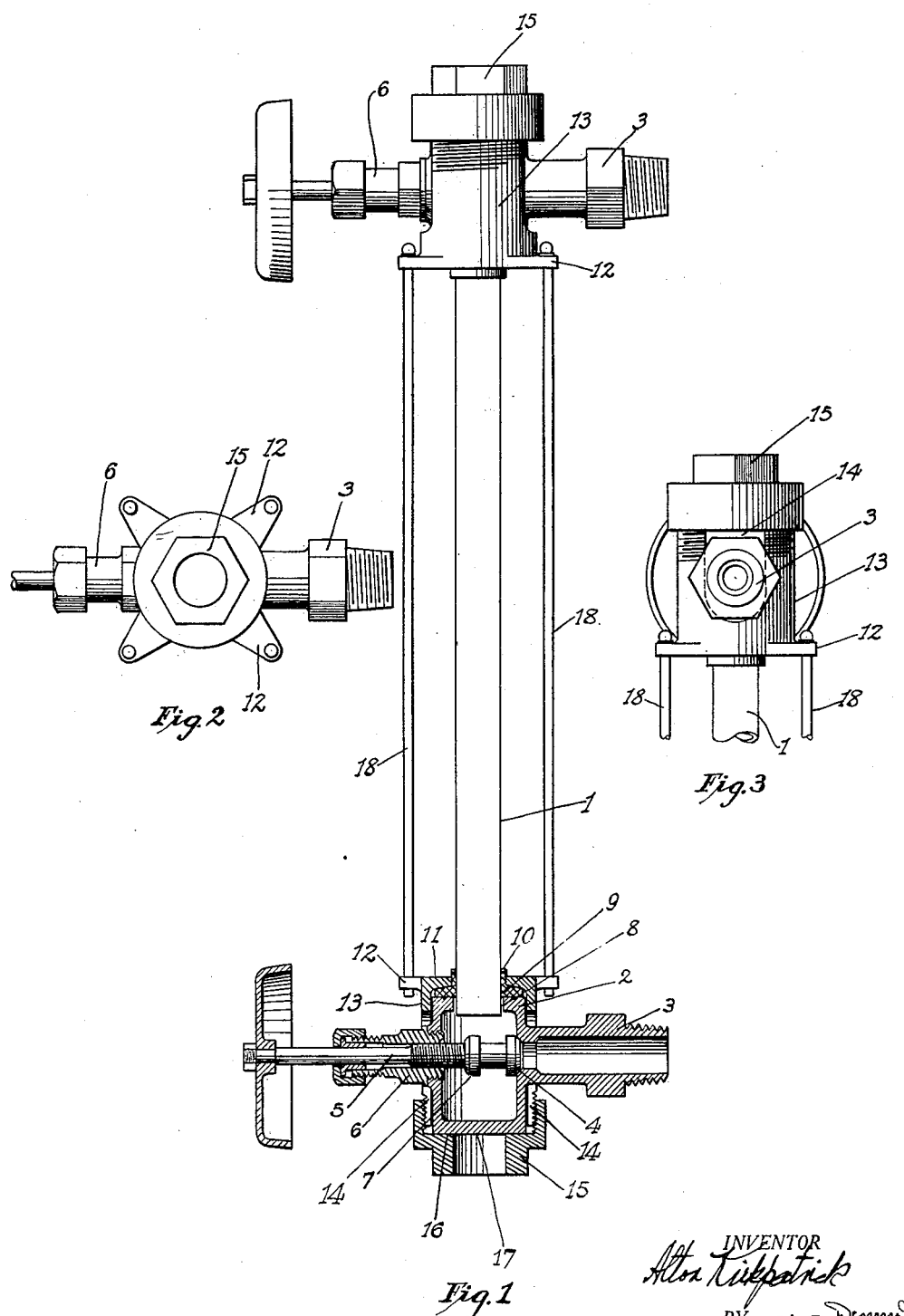

Dec. 27, 1932.  A. KIRKPATRICK  1,892,212

GAUGE

Filed Oct. 23, 1926

INVENTOR
Alton Kirkpatrick
BY
ATTORNEY

Patented Dec. 27, 1932

1,892,212

UNITED STATES PATENT OFFICE

ALTON KIRKPATRICK, OF LANSDOWNE, PENNSYLVANIA

GAUGE

Application filed October 22, 1926. Serial No. 143,537.

My invention is designed to provide improved means for sealing the joint between a gauge glass and its mountings so as to eliminate leakage likely to result from the partial unscrewing of the usual packing nut by the rebound of the elastic packing against which it is unscrewed and to avoid the application of torque to the gasket and tube, such torque commonly resulting in the distortion of the gasket and the breakage of the tube if the nut is drawn up tight enough to make a tight joint.

In accordance with my invention, the gauge glass or tube is securely engaged to a mounting or box at one or both ends thereof by a gasket or packing pressed against the box and tube by a non-revoluble follower or gland, which is preferably drawn up into a sealing position by a retainer engaging the end of the box remote from the tube. The rotation of the follower or gland may be conveniently prevented by slotting the cylindrical body thereof so as to engage a hollow boss on the box which is provided for the admission or emission of fluid thereto and the housing or valve mechanism controlling the flow of such fluid.

The characteristic features and advantages of my improvements will more fully appear from the following description and the accompanying drawing in illustration of a preferred embodiment thereof.

In the drawing Fig. 1 is an elevation partly in section, of a gauge embodying my invention; Fig. 2 is a top plan view thereof with the valve handle omitted; and Fig. 3 is an elevation of the upper mounting taken at right angles to the view shown in Fig. 1.

As illustrated in the drawing, a sight glass or tube 1 has its opposite ends engaged in fittings or mountings for the connection of the gauge with a drum or the like; each fitting comprising a cylindrical box or casing 2 having an integral threaded hollow boss 3 for the engagement with the drum or other support. The port between the hollow boss 3 and the chamber within the box 2 is controlled by a beveled valve 4 formed on a threaded stem 5 journalled in the housing 6 and provided with an auxiliary beveled valve disk 7 for sealing the passage through the housing 6 when the valve 4 is fully opened.

Each casing 2 is provided with a tube aperture 8 registering with a packing or gasket 9, preferably formed of elastic material, such as rubber, or of asbestos, or a combination thereof, the gasket having a cylindrical neck 10 projected from the disk base thereof either initially or by pressure in assembly of the gauge. The gasket or packing 9 is pressed tightly against the top of the box 2 and against the periphery of the tube 1, so as to seal the joint, by a gland or follower comprising a ring 11 having lugs 12 projecting radially therefrom and a cylindrical sleeve or skirt 13 projecting axially therefrom and adapted to be telescoped over the box 2. The sleeve 13 contains slots 14 for the passage of the bosses 3 and 6 and the follower or gland is thereby held against rotation. The lower bifurcated ends of the sleeve 13 are threaded and engaged by an internally threaded nut or retainer 15 having a surface 16 bearing against the end 17 of the box 2. The rods 18 seated in the lugs 12 protect the tube 1 from lateral knocks or blows.

It will be understood that, when the gauge is assembled or a tube changed therein, the nut 15 is unscrewed to loosen the gland formed by the collar 11 and sleeve 13 and release the packing 9. A gland having been sleeved on each end of the tube, a gasket is stretched over each end of the tube and usually makes a sufficiently close fit therewith to form a tight joint. The tube ends are then inserted into the openings 8 so that the bosses of the gaskets engage the ends of the boxes 2, the apertures 8 being preferably sufficiently larger in diameter than the tube to allow for any errors in the alignment of the mountings and for angular longitudinal movement of the tube in inserting it in fixed mountings. Upon tightening up the nuts 15, the glands 11 are drawn tightly and uniformly against the gaskets without rotation thereof or the application of torque to the tube or gasket. The pressure of the tapered surfaces of the glands on the gaskets form tight joints therewith with the ends of the boxes and with the tube.

Having described my invention, I claim

1. A gauge glass mounting comprising a casing having therein an aperture to receive an end of a gauge glass, a packing for sealing the joint between said gauge glass and casing, a gland for pressing said packing against said casing and glass, said gland having legs extending along opposite sides of said casing, a device preventing rotation of said gland, and a rotatable member engaging said casing and applying simultaneously a pull to both of said legs.

2. A gauge glass mounting comprising a casing having therein an aperture for a gauge glass, members projecting radially from said casing, and means for sealing a joint between said casing and a gauge glass inserted in said aperture, said means comprising a packing and a member having a part engaging said packing and a part sleeved on said casing and held against rotation by said radial projections, and a retainer engaging said sleeve and casing to move said sleeve relatively to said casing.

3. A gauge glass mounting comprising a casing having therein an aperture to receive the end of a gauge glass, a gasket seated on the end of said casing and surrounding said aperture, a bifurcated member having a bearing portion engaging said gasket, means projecting from said casing between the bifurcations of said member, and a device engaging said casing and member and adapted to draw said member against said gasket.

4. A tube mounting comprising a casing having an aperture therein, a hollow boss and a valve housing projecting radially from said casing, a gasket seated on said casing and surrounding said aperture, a bifurcated member having a flange at an end thereof engaging said gasket and a threaded cylindrical portion at the other end thereof embracing said casing, and a retainer engaging said casing and having a threaded cylindrical portion engaging the threaded cylindrical portion of said bifurcated member.

Signed at Philadelphia, in the county of Philadelphia and State of Pennsylvania this 22nd day of October, 1926.

ALTON KIRKPATRICK.